United States Patent
Liang et al.

(10) Patent No.: US 10,298,689 B2
(45) Date of Patent: May 21, 2019

(54) NETWORK NODE, ELECTRONIC DEVICE AND METHODS FOR BENEFITTING FROM A SERVICE PROVIDED BY A CLOUD

(71) Applicant: TELEFONAKTIEBOLAGET LM ERICSSON (PUBL), Stockholm (SE)

(72) Inventors: Hongxin Liang, Upplands Väsby (SE); Elena Fersman, Stockholm (SE); Neil Urquhart, Trosa (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 202 days.

(21) Appl. No.: 15/316,551

(22) PCT Filed: Jun. 17, 2014

(86) PCT No.: PCT/SE2014/050742
§ 371 (c)(1),
(2) Date: Dec. 6, 2016

(87) PCT Pub. No.: WO2015/195003
PCT Pub. Date: Dec. 23, 2015

(65) Prior Publication Data
US 2017/0149894 A1    May 25, 2017

(51) Int. Cl.
G06F 15/16      (2006.01)
H04L 29/08      (2006.01)
H04W 4/50       (2018.01)

(52) U.S. Cl.
CPC ...... H04L 67/1097 (2013.01); H04L 67/1002 (2013.01); H04L 67/22 (2013.01);
(Continued)

(58) Field of Classification Search
CPC . H04L 67/1002; H04L 67/1097; H04L 67/22; H04L 67/26; H04L 67/2838; H04L 67/303; H04L 67/34; H04W 4/50
(Continued)

(56) References Cited

U.S. PATENT DOCUMENTS 6,615,253 B1 *  9/2003  Bowman-Amuah ........................ G06F 17/30902
                                                707/999.1
9,992,306 B2 *  6/2018  Sahoo ...................... G06F 9/505
(Continued)

OTHER PUBLICATIONS

Koukoumidis et al., "Pocket Cloudlets," ASPLOS '11, Mar. 5-11, 2011, Newport Beach, CA, US.
(Continued)

*Primary Examiner* — Phuoc H Nguyen
(74) *Attorney, Agent, or Firm* — Patent Portfolio Builders PLLC

(57) ABSTRACT

A method in a first network node for assisting an electronic device to benefit from a service provided by a cloud is provided. The first network node is comprised in the cloud. The first network node obtains information from the electronic device. The information comprises computation and storage capability of the electronic device. The first network node determines a push content based on the information. The first network node retrieves binary executable and content from one or more second network nodes comprised in the cloud. The binary executable and content are based on the push content. The first network node then pushes the binary executable and content to the electronic device. This is to enable the electronic device to benefit from the service of the cloud without accessing the cloud.

10 Claims, 6 Drawing Sheets

(52) U.S. Cl.
CPC .......... *H04L 67/26* (2013.01); *H04L 67/2838* (2013.01); *H04L 67/34* (2013.01); *H04W 4/50* (2018.02); *H04L 67/303* (2013.01)

(58) Field of Classification Search
USPC ................................ 709/217, 219, 238–241
See application file for complete search history.

(56) References Cited

U.S. PATENT DOCUMENTS

| | | | | |
|---|---|---|---|---|
| 2011/0320520 | A1* | 12/2011 | Jain ....................... | G06F 9/5072 709/203 |
| 2012/0079095 | A1* | 3/2012 | Evans ....................... | G06F 8/61 709/224 |
| 2012/0079126 | A1* | 3/2012 | Evans ................. | H04L 67/1095 709/230 |
| 2013/0238761 | A1 | 9/2013 | Raleigh et al. | |
| 2014/0002833 | A1* | 1/2014 | Manchala ............. | G06F 3/1225 358/1.13 |
| 2014/0095457 | A1 | 4/2014 | Quan | |
| 2014/0095591 | A1 | 4/2014 | Chan et al. | |
| 2014/0237595 | A1* | 8/2014 | Sridhara ............. | H04L 63/1408 726/23 |

OTHER PUBLICATIONS

International Search Report and Written Opinion dated Feb. 23, 2015 in related International Application No. PCT/SE2014/050742.

\* cited by examiner

NETWORK NODE, ELECTRONIC DEVICE AND METHODS FOR BENEFITTING FROM A SERVICE PROVIDED BY A CLOUD

TECHNICAL FIELD

Embodiments herein relate to a first network node, an electronic device, and methods therein. In particular, it relates to benefiting from a service provided by a cloud.

BACKGROUND

Cloud computing in general may be portrayed as a synonym for distributed computing over a network, with the ability to run a program or application on many connected computers at the same time. It specifically refers to a Computing hardware machine or group of computing hardware machines commonly referred as a server connected through a communication network such as internet, intranet, local area network (LAN) or Wide area network (WAN) and Individual user or users who have permission to access the server can use the server's processing power for their individual computing needs like to run an application, store data or any other computing need alike. Therefore, instead of using a personal computer every-time to run the application, individual can now run the application from anywhere in the world, as the server provides the processing power to the application and the server is also connected to a network via internet or other connection platforms to be accessed from anywhere. All this has become possible due to increasing computer processing power available to humankind with decrease in cost.

In common usage, the term "the cloud" is essentially a metaphor for the Internet. Marketers have further popularized the phrase "in the cloud" to refer to software, platforms and infrastructure that are sold "as a service", i.e. remotely through the Internet. Typically, the seller has actual energy-consuming servers which host products and services from a remote location, so end-users don't have to; they can simply log on to the network without installing anything. The major models of cloud computing service are known as software as a service, platform as a service, and infrastructure as a service. These cloud services may be offered in a public, private or hybrid network.

Network-based services, which appear to be provided by real server hardware and are in fact served up by virtual hardware simulated by software running on one or more real machines, are often called cloud computing. Such virtual servers do not physically exist and can therefore be moved around and scaled up or down on the fly without affecting the end user, somewhat like a cloud becoming larger or smaller without being a physical object.

The term "cloud computing" is mostly used to sell hosted services in the sense of application service provisioning that run client server software at a remote location. End users access cloud-based applications through a web browser, thin client or mobile app while the business software and user's data are stored on servers at a remote location.

Thus, cloud computing is everywhere today, and lots of computations have been moved from terminals such as electronic devices to the cloud.

One of the problems of moving everything into the cloud is that devices become more and more dumb and if they cannot connect to the cloud for some reason (communication failure or cloud itself is down), the devises cannot do much and become unusable.

Today different solutions for managing application execution and content storage in a cloud computing environment, having local electronic devices with different capabilities are used. The prior art solutions below discloses how some of the data used in the cloud computing can be stored in local clients in order to make the processing more efficient, and/or to achieve at least some service even if the cloud is unavailable.

US2014095591 relates to a cloud computing system in which the electronic devices can preload some of the cloud files locally depending on user/device conditions. According to the document, a plurality of parameters can be used to decide when, and which files to preload, such as class of device, time of day, position, and relative position. The system described in this document can prefetch or preload content from the cloud, for example, a piece of news, video, audio, etc. All of these are around content. Content is something being presented to the end user in one way or another, but with the preloaded content, the local device is still not able to do a task that it was not designed to do.

Koukoumidis, E, et al. "Pocket Cloudlets". March 2011, ASPLOS 2011 (International Conference on Architectural Support for Programming Languages and Operating Systems) discloses a cloud service cache architecture that resides on the mobile device's non-volatile memory, called "pocket cloudlet" in order to reduce service latency and energy consumption. One example discusses a "mini search engine" running on the phone and using preloaded data judged to be relevant, such as local data.

In this architecture the "cloudlet" is created/installed manually on the device, and the computation capability is fixed for the device. A cloudlet is designed and installed onto a local device manually, and its capabilities or functionalities are fixed.

SUMMARY

It is therefore an object of embodiments herein to provide an improved way of benefiting from a service of a cloud According to a first aspect of embodiments herein, the object is achieved by a method in a first network node for assisting an electronic device to benefit from a service provided by a cloud. The first network node is comprised in the cloud. The first network node obtains information from the electronic device. The information comprises computation and storage capability of the electronic device. The first network node determines a push content based on the information. The first network node retrieves binary executable and content from one or more second network nodes comprised in the cloud. The binary executable and content are based on the push content. The first network node then pushes the binary executable and content to the electronic device. This is to enable the electronic device to benefit from the service of the cloud without accessing the cloud.

According to a second aspect of embodiments herein, the object is achieved by a method in an electronic device for benefiting from a service provided by a cloud. The electronic device sends information to a first network node. The information comprises computation and storage capability of the electronic device. The first network node is comprised in the cloud. The electronic device receives a push of binary executable and content from the first network node. The pushed binary executable and content is based on the information sent to the first network node. The electronic device benefits from the service of the cloud without accessing the cloud, by using the pushed binary executable and content.

According to a third aspect of embodiments herein, the object is achieved by a first network node for assisting an electronic device to benefit from a service provided by a cloud. The first network node is adapted to be comprised in the cloud. The first network node is configured to:
    obtain information from the electronic device, which information comprises computation and storage capability of the electronic device,
    determine a push content based on the information,
    retrieve from one or more second network nodes comprised in the cloud, binary executable and content, which binary executable and content are to be based on the push content, and
    push the binary executable and content to the electronic device to enable the electronic device to benefit from the service of the cloud without accessing the cloud.

According to a fourth aspect of embodiments herein, the object is achieved by an electronic device for benefiting from a service provided by a cloud, the electronic device is configured to:
    send information to a first network node, which information comprises computation and storage capability of the electronic device, and which first network node is adapted to be comprised in the cloud,
    receive a push of binary executable and content from the first network node, which pushed binary executable and content is to be based on the information sent to the first network node, and
    benefit from the service of the cloud without accessing the cloud, by using the pushed binary executable and content.

Since the binary executable and content is pushed from the first network node to the electronic device, the electronic device can benefit from the service of the cloud without accessing the cloud.

An advantage of embodiments herein is that based on the capabilities of the electronic device, certain computation can be pushed down to the electronic device, which:
    minimizes the need for network connection,
    improves user experiences of the electronic device when there is no network connection
    improves user experiences of the electronic device when latency is the major part of cloud computing, meaning that computing locally takes shorter time than invoking cloud services, and
    relieves the pressure of the cloud.

BRIEF DESCRIPTION OF THE DRAWINGS

Examples of embodiments herein are described in more detail with reference to attached drawings in which.

DETAILED DESCRIPTION

Figure 1:
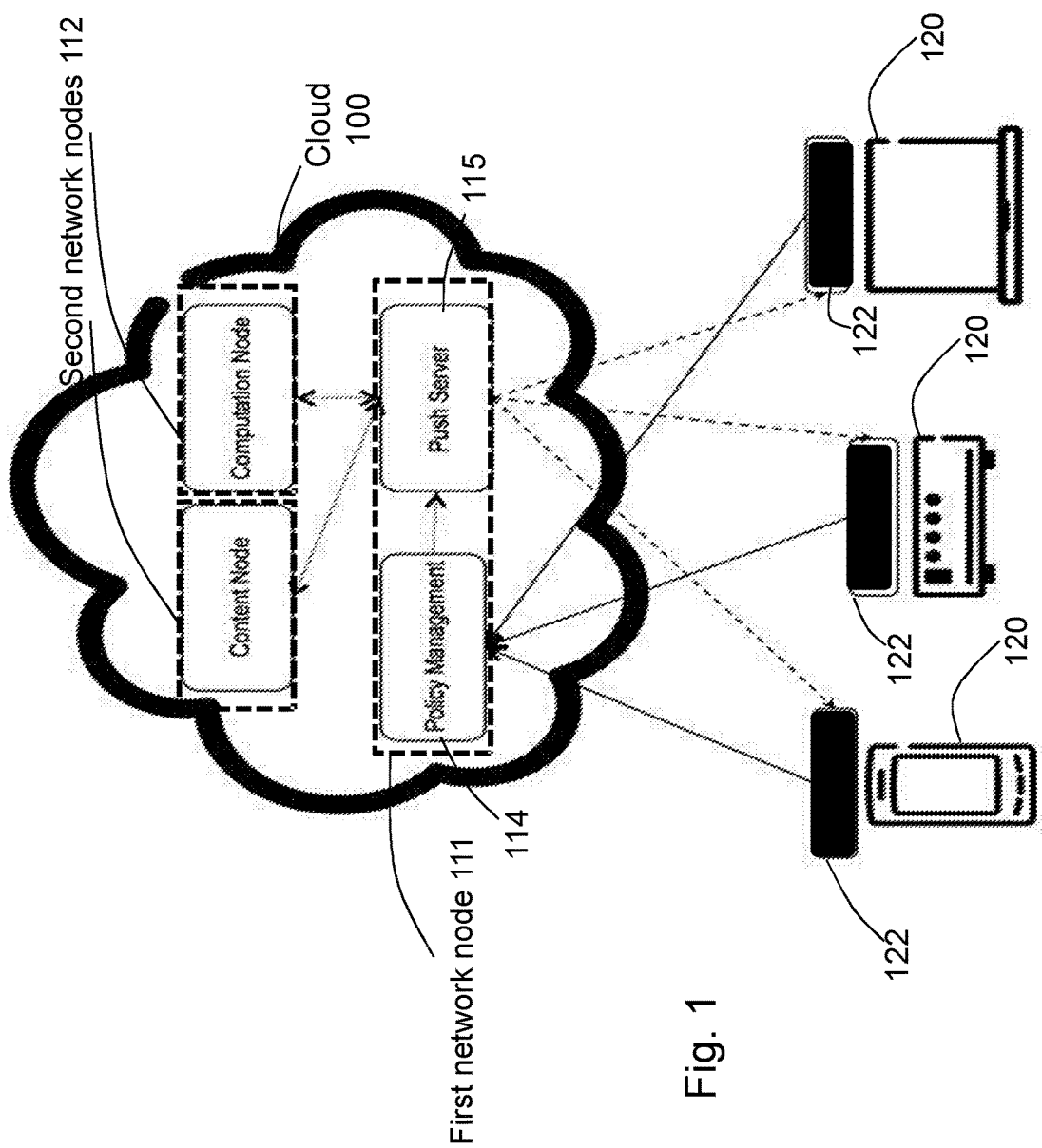
FIG. 1 is a schematic block diagram illustrating embodiments in a communications network.

According to embodiments herein, a cloud computing system is provided where the system may offer some basic functionality in the event of cloud connection failure. This is performed by pushing versions of binary executable and content to a local electronic device, and relying on local processing in an offline situation. Embodiments herein may use a local cloud management and a push server to push data that is adapted to the client capabilities. The content may also be adapted to other conditions, such as device location, user activity, etc.

In an example scenario, the functionality may be image recognition. In this example the local electronic device has no such feature designed initially, the cloud then pushes the executable and content to the local device. Based on its hardware capability for example, the executable and content can be fully-featured or partially-featured, which means that if the local electronic device is powerful enough, a sophisticated algorithm may be pushed back, otherwise a simplified version that can do the work but not guaranteed to be accurate.

As mentioned above, US2014095591 relates to a cloud computing system in which the electronic devices can preload some of the cloud files locally depending on user/device conditions. According to the document, a plurality of parameters can be used to decide when, and which files to preload, such as class of device, time of day, position, and relative position. This cloud computing system is about prefetching content for example, a piece of news, video, audio, etc., while in embodiments herein, executables can be pushed from the remote cloud, not only the content. Content is something being presented to the end user in one way or another, and even with the preloaded content, the local device is still not able to do a task that it was not designed to do. Embodiments herein can receive executable from the cloud, and the executable may enhance local processing capabilities. For example, initially the local electronic device cannot handle image recognition at all. A network node in the cloud then push a module back to the local electronic device, and this module enables the local device to do image recognition without accessing the cloud.

Koukoumidis, E, et al. As mentioned above, discloses a cloud service cache architecture that resides on the mobile device's non-volatile memory, called "pocket cloudlet" in order to reduce service latency and energy consumption.

In this architecture the "cloudlet" is created and installed manually on the device, while according to embodiments herein, push data that is adapted to the client capabilities is pushed by the remote cloud, so initially nothing will be done on the device, and the computation capability is built up by reasoning upon the device's hardware. The computation capability is fixed for the device in Koukoumidis, while according to embodiments herein, capability can change overtime or across different devices.

The cloudlet in Koukoumidis, regardless of whatever it is capable of, is designed and installed onto a local device manually, and its capabilities or functionalities are fixed.

Embodiments herein are performed without installing any of the cloudlet, i.e. executable initially, but depending on the runtime needs or hardware capabilities of the local electronic device, the cloud can push whatever needed to the local electronic device.

FIG. 1 depicts an example of a cloud 100 in which embodiments herein may be implemented. The cloud 100 may be communications network such as e.g. a part of the Internet. The cloud 100 may comprise software, platforms and infrastructure owned by a service provider offering a service provided remotely to end users such as electronic devices through the Internet. A service provider may have energy-consuming servers which host products and services from a remote location, so end users may simply log on to the cloud 100 without installing anything. The computing service of the cloud 100 may be referred to as software as a service, platform as a service, and infrastructure as a service. These cloud services may be offered in a public, a private or a hybrid communications network.

A plurality of network nodes operates in the cloud 100 whereof a few, a first network node 111 and one or more second network nodes 112 are depicted in FIG. 1. The first network node 111 may be a generic physical computer, or virtual machine, or simply a process, and is capable to serve one or more electronic devices remotely. The first network node 111 may comprise functionality such as a policy management 114 and a push server 115. The Policy Management 114 is responsible to map electronic devices such as the electronic device 120, capabilities to certain binaries and contents for certain task such as image recognition. The Push Server 115 is responsible to retrieve binaries and contents, and push them back to the electronic device 120.

The second network node 112 may also be a generic physical computer, or virtual machine, or simply a process, and is capable to serve one or more electronic devices remotely. In FIG. 1, two second network nodes 112 are depicted whereof one second network node 112 may be a content node, and the other second network node 112 may be a computation node. In some embodiments, the computation node and the content node may be collocated in the same second network node 112. A content node is managing contents, and sends back contents per request to the push server 115. The computation node is managing binaries and sends back binaries per request to the push server 115.

A plurality of electronic devices operates in the cloud 100 whereof three electronic devices 120 are depicted in FIG. 1. In the text the term electronic device 120 is used in singular even if there may be a plurality of electronic devices operates in the cloud 100.

The electronic device may be any one out of a mobile terminal or a wireless terminal, a mobile phone, a computer such as e.g. a laptop, a PDA, a tablet computer, sometimes referred to as a surf plate, e.g. with wireless capability, or any other electronic device capable to communicate in a cloud. Please note the term electronic device used in this document also covers other electronic devices such as Machine to machine (M2M) devices, even though they do not have any user. The electronic device 120 may comprise functionality which e.g. may be referred to as Local cloud management 122. The functionality may comprise collecting capabilities of the electronic device 120, sending them to the cloud 100, receiving pushed binaries and contents, building up local-cloud and working transparently between applications and the cloud 100 to handle applications requests locally if possible. I.e., the local-cloud is built up in the electronic device 120.

Embodiments herein may be based on computation and storage capability of the electronic device 120 and e.g. usage of the electronic device 120. Embodiments herein comprises pushing both binary executable and content from the cloud 100 to the electronic device 120 to enable the electronic device 120 to do certain computation and content delivery even without access to the cloud 100.

The first network node 111 such as e.g. the policy management 114 decides what kind of executable should be pushed back to the local electronic device 120, based on the electronic device 120's hardware capability, and in some embodiments the usage pattern of the electronic device 120. The output of policy management is a policy that is read by the push server, and the push server pushes executable accordingly back to the electronic device 120.

Storing also referred to caching of binary executable and content in the electronic device 120 forms a "local-cloud".

Figure 3:
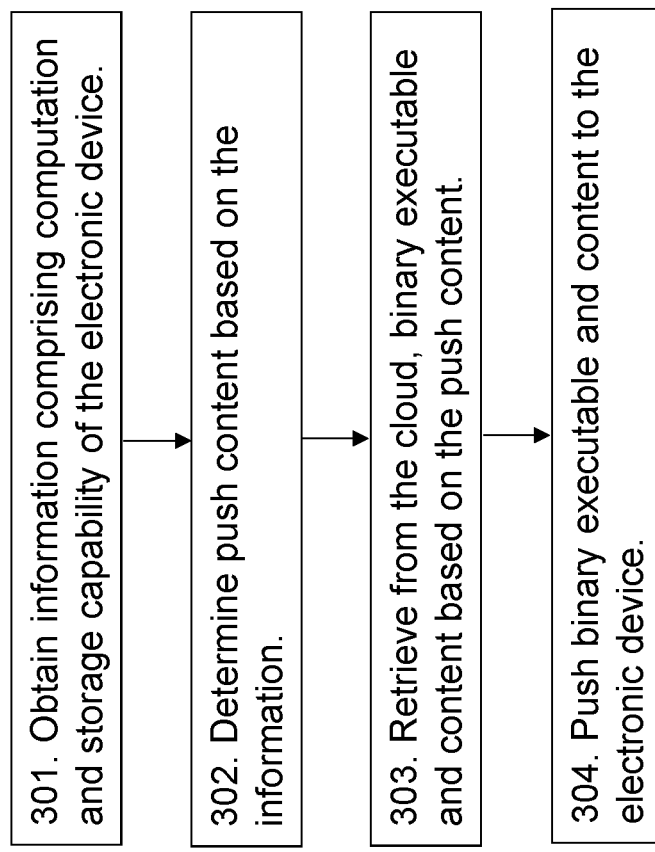
FIG. 3 is a flowchart depicting embodiments of a method in a first network node.
Figure 4:
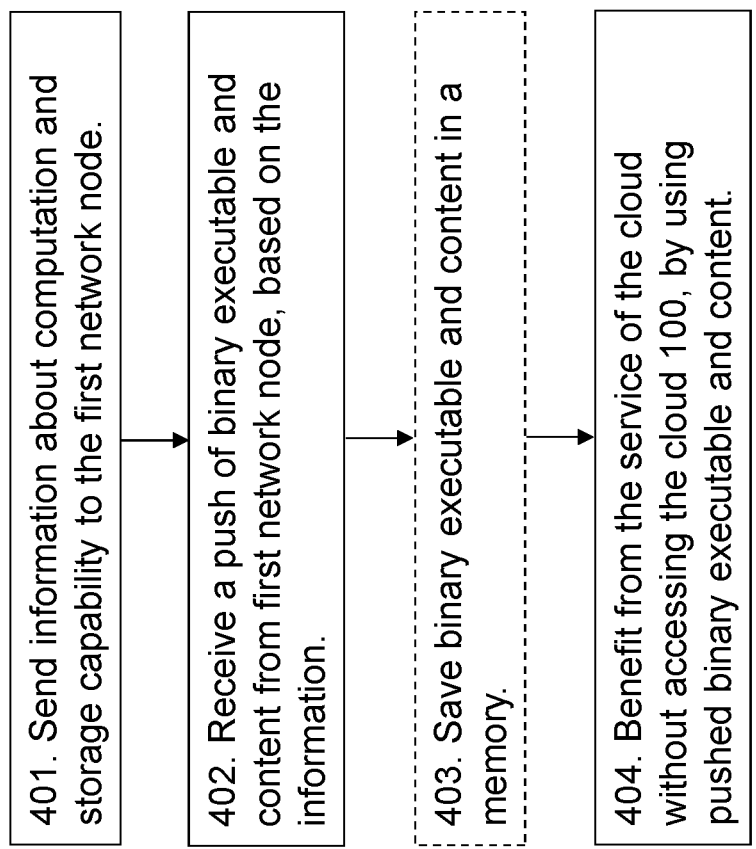
FIG. 4 is a flowchart depicting embodiments of a method in an electronic device.

Embodiments of a method will first be described in sequence diagram depicted in FIG. 2. Embodiments of the method will then be described in a general way in a view seen from the first network node 111 as depicted in FIG. 3, followed by a view seen from the electronic device 120 as depicted in FIG. 4.

Thus example embodiments of a method for benefit from a service provided by the cloud 100, will now be described with reference to the combined signalling diagram and flow chart depicted in FIG. 2. FIG. 2 shows the process building up the local-cloud starting from reporting capability. As mentioned above, the first network node 111 is comprised in the cloud 100. The method comprises the following actions, which actions may be taken in any suitable order.

Action 201

In this action the electronic device 120 reports to first network node 111 its computation and storage capability, such as e.g. to a Policy Management unit in the first network node 111.

Thus the electronic device 120 sends information which is received by the first network node 111. The information comprises computation and storage capability of the electronic device 120. In some embodiments, the information further comprises a usage pattern of the electronic device 120.

The computation capabilities may e.g. comprise size of a Central Processing Unit (CPU) of the electronic device 120, speed and number cores of a CPU of the electronic device 120, The storage capabilities may e.g. comprise size of a memory of the electronic device 120, size of a memory of the electronic device 120, speed as a factor of storage and/or memory. The information about the usage pattern, may for example comprise what kind of functionalities the electronic device 120 have been using quite often in the cloud 100 but not yet on the electronic device 120 itself.

Hardware capabilities such as CPU and storage characteristics may be sent only once initially when the electronic device 120 registers itself and afterwards whenever necessary for example when it gets upgraded. The policy management 114 may maintain a cache mapping device Identity (ID) to its capabilities. The local-cloud management may check the electronic device's 120 capabilities from time to time, and notify the policy management 114 if anything changes.

The information may be sent via a web service such as Application Programming Interface (API) that may be provided by the cloud 100. In computer programming, an API specifies how some software components should interact with each other.

Action 202

The first network node 111 determines a push content based on the information. In some embodiments this is performed in the policy management 114. Push content here means both executable and necessary static content such as e.g. text, audio, video, etc.

When the electronic device 120 registers itself for the first time, policy management may check the hardware capabilities of the electronic device 120 and determines what kind of functionalities the electronic device 120 can do locally. This may e.g. be implemented by looking up a table such as Table 1 shown below:

TABLE 1

| Functionality | Invocation Threshold | Capabilities | To be Pushed |
|---|---|---|---|
| Image recognition | 10 | 2 GB Memory + 1.0 GHz CPU | Advanced algorithm + full content |
| | | 128 MB Memory + 512 MHz CPU | Simplified algorithm + partial content |
| | | 128 KB Memory + 128 MHz CPU | Not applicable |

Action 203

According to some embodiments, the first network node 111 may transfer the push content from the policy management 114 to the push server 115.

This may be performed by sending a list describing what kind of executable and content to push back to the electronic device 120. It is a list generated by the policy management 114 and sent to the push server 115, and hence the push server 115 may fetch and push items on the list to the electronic device 120.

Action 204

The first network node 111 retrieves from one or more second network nodes 112 comprised in the cloud 100, binary executable and content, which binary executable and content are based on the push content. Thus in this action the first network node 111 such as by means of the push server, retrieves from the second network node 112 comprised in the cloud 100, e.g. in the computation node, binary executable. The binary executable is based on the push content. This means that the push server 114 may retrieve binary executable from the computation node.

This action may be performed by looking up another table such as Table 2 below:

TABLE 2

| Executable | Extension | URI |
|---|---|---|
| Image recognition algorithm | Advanced version | /path/to/advanced_version/libimagerecognition.so |
| Image recognition algorithm | Simplified version | /path/to/simplified_version/libimagerecognition.so |

For example, binary executable such as an image recognition algorithm to be used for image recognition is retrieved in table 2 based on the determined push content.

The term "binary executable" here means a file or piece of memory block in binary format which may be executed directly by the electronic device 120's CPU. In computing, an executable file causes a computer to perform indicated tasks according to encoded instructions, as opposed to a data file that must be parsed by a program to be meaningful. These instructions are traditionally machine code instructions for a physical CPU. However, in a more general sense, a file containing instructions such as byte code for a software interpreter may also be considered executable; even a scripting language source file may therefore be considered executable in this sense. The exact interpretation depends upon the use; while the term often refers only to machine code files, in the context of protection against computer viruses all files which cause potentially hazardous instruction execution, including scripts, are lumped together for convenience.

Action 205

As mentioned above, the first network node 111 retrieves from one or more second network nodes 112 comprised in the cloud 100, binary executable and content, which binary executable and content are based on the push content. Thus in this action the first network node 111 retrieves the content, e.g. by means of the push server 115, from the second network node 112 comprised in the cloud 100. This is e.g. when the second network node 112 is represented by the content node. The content is based on the push content. This means that the push server 115 may retrieves content from the content node.

The term "content" here means a static content used by executable to achieve certain functionalities, for example, a database required by image recognition executable.

This action may be performed by looking up yet another table such as Table 3 below:

TABLE 3

| Content | Extension | URI |
|---|---|---|
| Image recognition database | Advanced version | /path/to/advanced_version/imagerecognition.db |
| Image recognition database | Simplified version | /path/to/simplified_version/imagerecognition.db |

For example, content such as an image recognition database to be used for image recognition is retrieved in Table 3 based on the determined push content.

Action 206

The first network node 111 then pushes the binary executable and content to the electronic device 120. This is performed to enable the electronic device 120 to benefit from the service of the cloud 100 without accessing the cloud 100. This means that the pushed binary executable and content is based on the information sent by the electronic device 120 to the first network node 111 in Action 201 above.

Table 1 above shows a scenario relating to image recognition, wherein a threshold, here referred to as Invocation threshold acts as an additional checkpoint, meaning that e.g. an image recognition feature will not be pushed to the electronic device 120 until it has been used by the electronic device 120 for at least 10 times. The electronic device's 120 capabilities may allow doing image recognition locally; it is thus an example of usage pattern. More specifically if the electronic device 120 only uses this feature once or a couple of times, it is not very suitable to push it to the electronic device 120. While at the point the first network node 111 in the cloud 100 may push back executable and content, it does not have to so, because it doesn't understand the usage pattern of the electronic device 120, for example, the electronic device 120 may never use image recognition at all.

Afterwards, if the electronic device 120 issues an image recognition request to the cloud 100, a reference count may be increased by 1, and if this count reaches a threshold, shown in table 1 as indicating 10, the cloud 100 will push back the related executable and content to the electronic device 120. Thus in this example, the electronic device have to issue an image recognition request to the cloud 100 10 times before it is pushed back. This is an advantage since it is not suitable to push a feature back to the electronic device 120 if it only will be used once.

In this action the push server 114 in the first network node 111 may push the retrieved binary executable and content to the electronic device 120.

The electronic device 120 may benefit from the service of the cloud 100 without accessing the cloud 100 when the cloud 100 is not accessible, or when a quality of a communication link to the cloud 100 is below a threshold.

In some embodiments the pushing of the binary executable and content to the electronic device 120 is performed to decrease a load of the cloud 100. A cloud service is built to be shared by all possible clients, and if some of the clients, such as a client in the electronic device 120, can access the service locally, the load of the cloud 100 can be decreased.

Further, the electronic device 120 may benefit from the service of the cloud 100 without accessing the cloud 100 when benefiting from the service of the cloud 100 comprises more latency via accessing the cloud 110 than by not accessing the cloud 110.

This action of pushing may be performed by sending the binary executable and content via a push service. A push service such as push, or server push, describes a style of Internet-based communication where the request for a given transaction is initiated by the publisher or central server. Examples of a Push service are a Hypertext Transfer Protocol (HTTP) server push, a Multipurpose Internet Mail Extensions (MIME) type called multipart/x-mixed-replace, a Pushlet, a Long polling, or a Flash XMLSocket relays, just to mention some.

Figure 2:
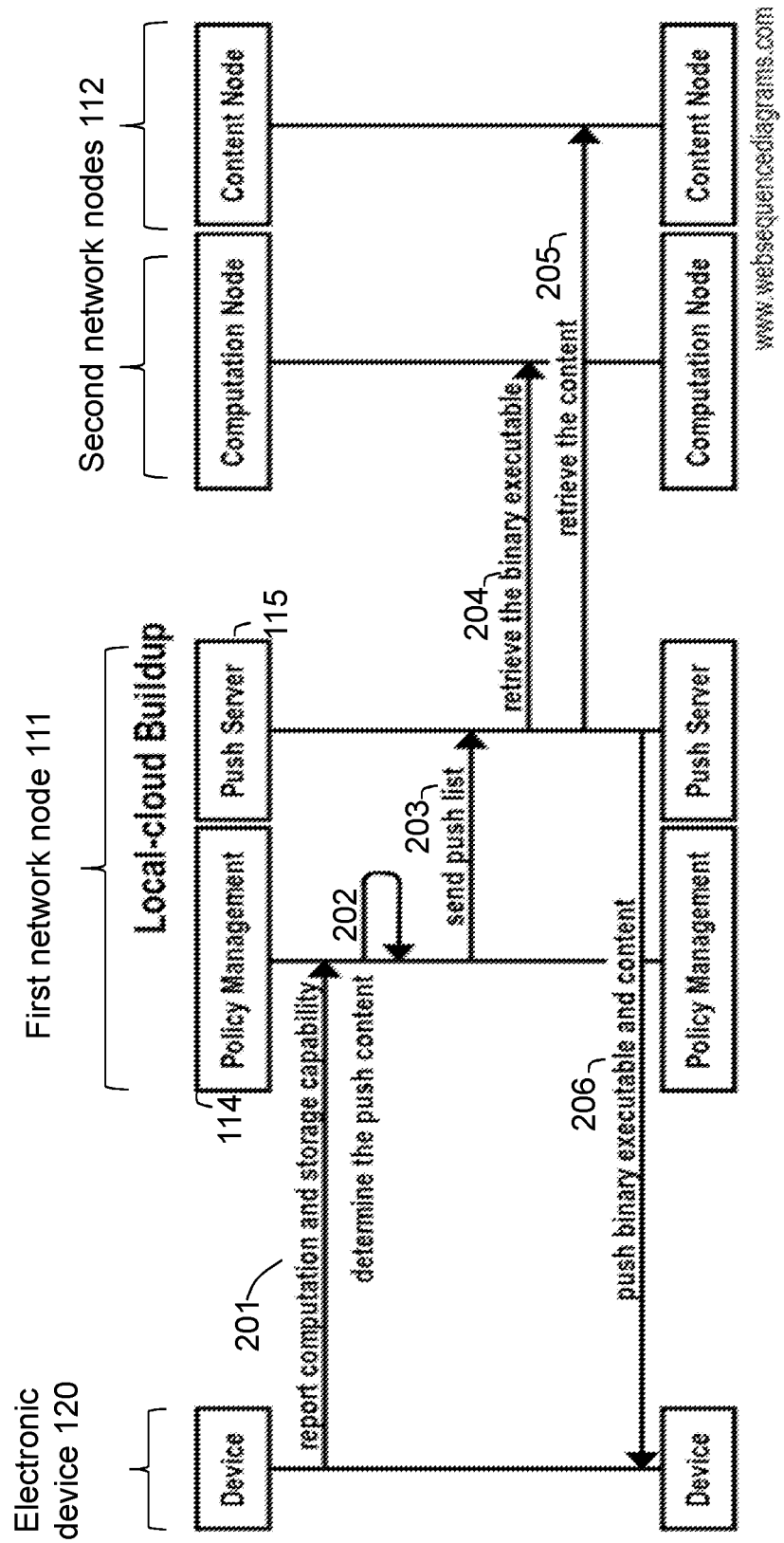
FIG. 2 is a combined flowchart and signalling diagram depicting embodiments of a method.

Action 207 (Not Shown in FIG. 2)

The electronic device 120 may save the binary executable and content in a memory of the electronic device 120.

Action 208 (Not Shown in FIG. 2)

The electronic device 120 then benefits from the service of the cloud 100 without accessing the cloud 100. This is performed by using the pushed binary executable and content. This may be performed when needed by the electronic device 120.

The electronic device 120 may use the cached binary executable and content directly in its own memory without sending a request to the cloud 100.

In some embodiments, the electronic device 120 benefits from the service of the cloud 100 without accessing the cloud 100 by using the pushed binary executable and content directly in the memory of the electronic device 120.

The benefiting from the service of the cloud 100 without accessing the cloud 100 may be done at different abstraction levels, such as e.g. the example below, and either of them would work.

In one example, the application, such as e.g. image recognition, running on the electronic device 120 benefiting from the cloud 100 will first check if there is a local cached version, and if there is, it will just invoke that, otherwise it will send request to the cloud 100.

In another example, an access API of the cloud 100 handles it transparently. The application itself is not aware of anything about cached version, it will just invoke the cloud 100 API to access the service, and this API will apply cache checking and so on.

Binary executable and content may be pushed not only according to capability, but also based on the electronic device 120 location, activities of the user using the electronic device 120, etc.

As a concrete example, a public transportation application may be designed according to the embodiments herein. If the electronic device 120 is a normal computer, binary executable such as complicated routing algorithms may be pushed down to the electronic device 120; otherwise if it is a low-end mobile phone binary executable such as a simplified routing algorithm may be pushed to enable at least certain functionalities. Low-end means for example slower CPU, less cores, slower storage, or small size of storage. A routing algorithm is basically an algorithm given a start and end point, which calculates the route connecting the start and end point. Also the content may be pushed according to the electronic device 120 location. For example, if the electronic device 120 is a mobile phone located in Kista, then public transportation information around Kista may be pushed to the electronic device 120.

Other examples are image recognition, which has been explained above, and a news application. When the user of the electronic device 120 is reading news displayed on the electronic device 120, related news or the news that the friends of the user are reading may be pushed to the electronic device 120. Then if later on the communication to the cloud 100 is down, the user is still able to read something since the news will still be displayed on the electronic device 120.

Embodiments herein are not intended to make a replica of a cloud. Computation inside a cloud 100 still has higher priority, meaning that if there is nothing wrong with the cloud 100, local-cloud may not be used in the first place.

Embodiments of the method described more in detail above in relation to FIG. 2, will now be described in a mare general way, in a view seen from the first network node 111. Thus example embodiments of the method in the first network node 111 for assisting the electronic device 120 to benefit from a service provided by a cloud 100 will now be described with reference to a flowchart depicted in FIG. 3.

The method comprises the following actions, which actions may be taken in any suitable order.

Action 301.

The first network node 111 obtains information from the electronic device 120, which information comprises computation and storage capability of the electronic device 120. The information may further comprise a usage pattern of the electronic device 120. This action is explained and performed according to Action 201 above.

Action 302.

The first network node 111 determines a push content based on the information. This action is explained and performed according to Action 202 above.

Action 303.

The first network node 111 retrieves from one or more second network nodes 112 comprised in the cloud 100, binary executable and content. The binary executable and content are based on the push content. This action is explained and performed according to Actions 204 and 205 above.

Action 304.

The first network node 111 pushes the binary executable and content to the electronic device 120 to enable the electronic device 120 to benefit from the service of the cloud 100 without accessing the cloud 100.

The enabling the electronic device 120 to benefit from the service of the cloud 100 without accessing the cloud 100 may be used when the cloud 100 is not accessible, or when a quality of a communication link to the cloud 100 is below a threshold.

In some embodiments, the pushing of the binary executable and content to the electronic device 120 may be performed to decrease a load of the cloud 100.

The enabling of the electronic device 120 to benefit from the service of the cloud 100 without accessing the cloud 100 may be used when benefiting from the service of the cloud 100 comprises more latency via accessing the cloud 110 than by not accessing the cloud 110.

This action is explained and performed according to Action 206 above.

Embodiments of the method described more in detail above in relation to FIG. 2, will now be described in more general way, in a view seen from the electronic device 120. Thus example embodiments of the method in the electronic device 120 for benefiting from a service provided by a cloud 100 will now be described with reference to a flowchart depicted in FIG. 4. As mentioned above, the first network node 111 is comprised in the cloud 100.

The method comprises the following actions, which actions may be taken in any suitable order. Dashed lines of one box in FIG. 4 indicate that this action is not mandatory.

Action 401

The electronic device 120 sends information to the first network node 111. The information comprises computation and storage capability of the electronic device 120.

The information may further comprise a usage pattern of the electronic device 120.

This action is explained and performed according to Action 201 above.

Action 402

The electronic device 120 receives a push of binary executable and content from the first network node 111. The pushed binary executable and content is based on the information sent to the first network node 111.

This action is explained and performed according to Action 206 above.

Action 403

In some embodiments, the electronic device 120 saves the binary executable and content in a memory of the electronic device 120.

This action is explained and performed according to Action 207 above.

Action 404

The electronic device 120 benefits from the service of the cloud 100 without accessing the cloud 100, by using the pushed binary executable and content.

This action is explained and performed according to Action 208 above.

The benefiting from the service of the cloud 100 without accessing the cloud 100 by using the pushed binary executable and content is in some embodiments performed when the cloud 100 is not accessible, or when a quality of a communication link to the cloud 100 is below a threshold.

The benefiting from the service of the cloud 100 without accessing the cloud 100 by using the binary executable and content may further be performed to decrease a load of the cloud 100.

In some embodiments, benefiting from the service of the cloud 100 without accessing the cloud 100 by using the binary executable and content is performed when benefiting from the service of the cloud 100 comprises more latency via accessing the cloud 110 than by not accessing the cloud 110.

In the embodiments wherein the binary executable and content are saved in a memory of the electronic device 120, the benefiting from the service of the cloud 100 without accessing the cloud 100 may be performed by using the pushed binary executable and content directly in the memory.

As mentioned above, an advantage of embodiments herein is that based on the capabilities of the electronic device 120, certain computation can be pushed down to the electronic device 120, which:

minimizes the need for network connection,
improves user experiences of the electronic device when there is no network connection
improves user experiences of the electronic device 120 when latency is the major part of cloud computing, meaning that computing locally takes shorter time than invoking cloud services, and
relieves the pressure of the cloud.

Nothing manual needs to be done at the electronic device's 120 side, and binary and content are pushed from the server, which means different electronic devices or the same device at different stages, changing of hardware, for example, can be configured differently.

Figure 5:
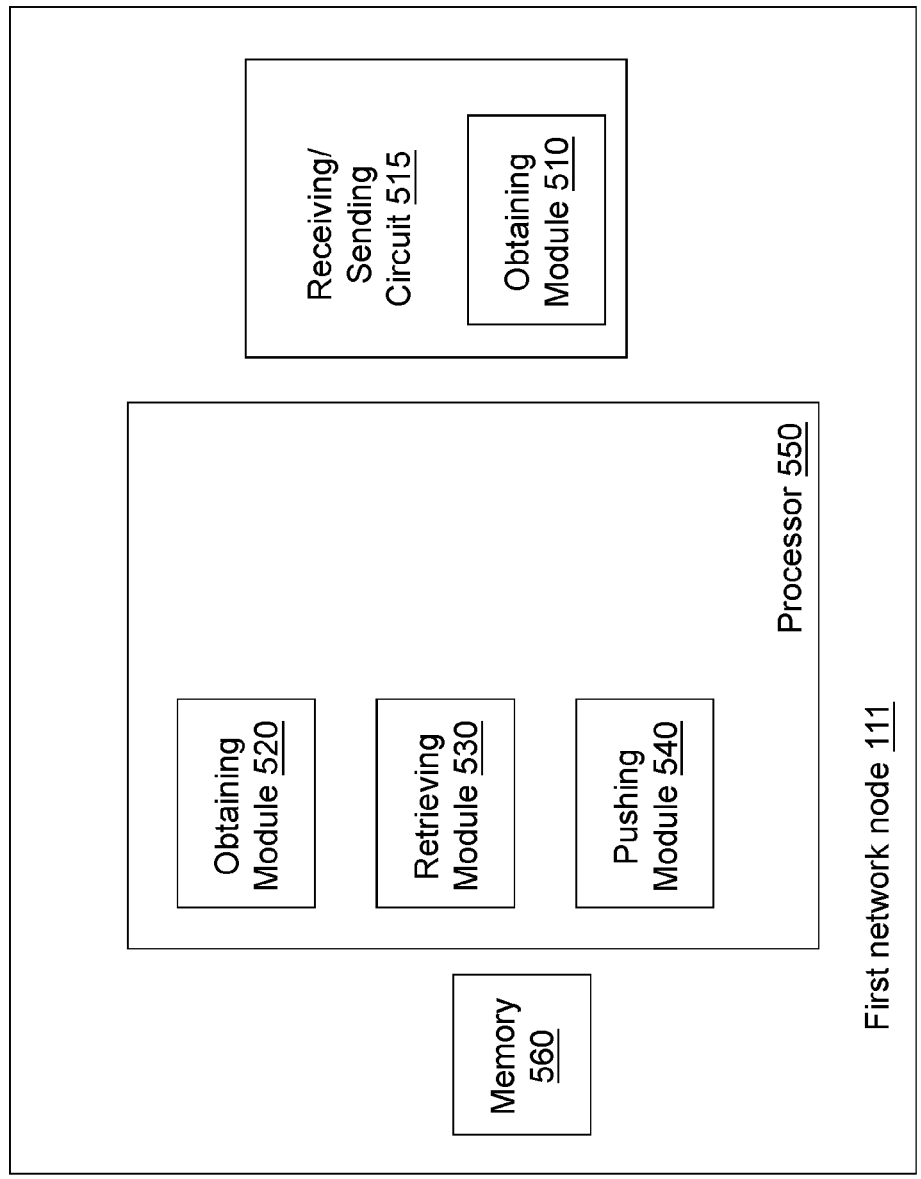
FIG. 5 is a schematic block diagram illustrating embodiments of a first network node.

To perform the method actions for assisting the electronic device 120 to benefit from a service provided by the cloud 100 described above in relation to FIGS. 2 and 3, the first network node 111 may comprise the following arrangement depicted in FIG. 5. As mentioned above, the first network node 111 is adapted to be comprised in the cloud 100.

The first network node 111 is configured to, e.g. by means of an obtaining module 510 configured to, obtain information from the electronic device 120. The information comprises computation and storage capability of the electronic device 120.

The information may further comprise a usage pattern of the electronic device 120. The obtaining module 510 may be comprised in sending/receiving circuit 515 in the first network node 111.

The first network node 111 is configured to, e.g. by means of a determining module 520 or the Policy Management 114 configured to, determine a push content based on the information.

The first network node 111 is further configured to, e.g. by means of a retrieving module 530 or the push server 115 configured to, retrieve from one or more second network nodes 112 comprised in the cloud 100, binary executable and content. The binary executable and content are to be based on the push content.

The first network node 111 is configured to, e.g. by means of a pushing module 540 or the push server 115 configured to, push the binary executable and content to the electronic device 120 to enable the electronic device 120 to benefit from the service of the cloud 100 without accessing the cloud 100.

In some embodiments, the push of the binary executable and content to the electronic device 120 is to be performed in order to decrease a load of the cloud 100.

In some embodiments, the enabling of the electronic device 120 to benefit from the service of the cloud 100 without accessing the cloud 100, is to be used when the cloud 100 is not accessible, or when a quality of a communication link to the cloud 100 is below a threshold.

In some embodiments, the enabling the electronic device 120 to benefit from the service of the cloud 100 without accessing the cloud 100 is further to be used when benefiting from the service of the cloud 100 comprises more latency via accessing the cloud 110 than by not accessing the cloud 110.

The embodiments of pushing binary executable and content and enabling the electronic device 120 to benefit from the service described above may be used separate or combined with each other.

The determining module 520, the retrieving module 530, and the pushing module 540 may be comprised in a processor 550 of the first network node 111.

Figure 6:
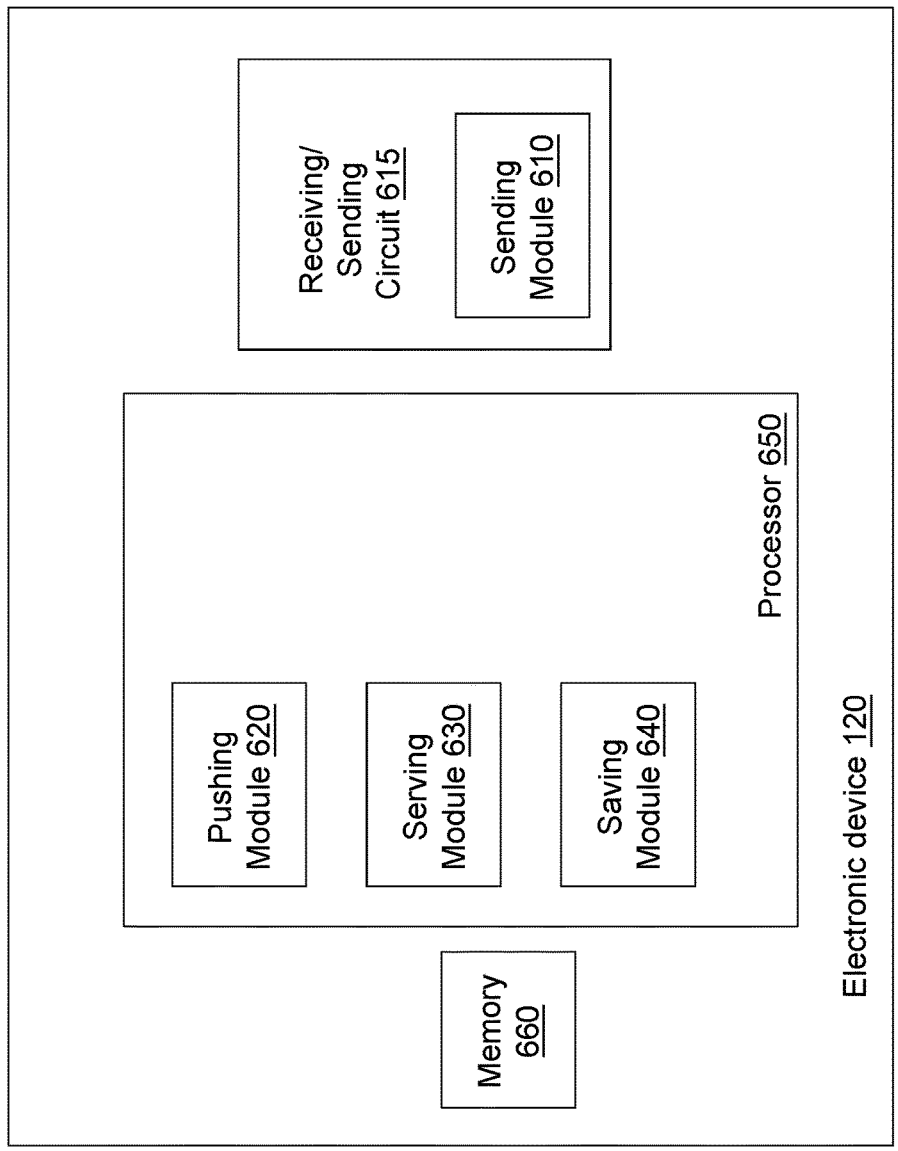
FIG. 6 is a schematic block diagram illustrating embodiments of an electronic device.

To perform the method actions for benefiting from a service provided by a cloud 100 described above in relation to FIGS. 2 and 4, the electronic device 120 may comprise the following arrangement depicted in FIG. 6. As mentioned above, the first network node 111 is adapted to be comprised in the cloud 100.

The electronic device 120 is configured to, e.g. by means of a sending module 610 configured to, send information to a first network node 111. The information comprises computation and storage capability of the electronic device 120.

The information may further comprise a usage pattern of the electronic device 120.

The sending module 610 may be comprised in sending/receiving circuit 615 in the first network node 111.

The electronic device 120 is further configured to, e.g. by means of a pushing module 620 configured to, receive a push of binary executable and content from the first network node 111. The pushed binary executable and content is to be based on the information sent to the first network node 111.

The electronic device 120 is further configured to, e.g. by means of a serving module 630 configured to, benefit from the service of the cloud 100 without accessing the cloud 100, by using the pushed binary executable and content.

In some embodiments, to benefit from the service of the cloud 100 without accessing the cloud 100 by using the pushed binary executable and content is to be performed when the cloud 100 is not accessible, or when a quality of a communication link to the cloud 100 is below a threshold.

In some embodiments, to benefit from the service of the cloud 100 without accessing the cloud 100 by using the binary executable and content, is to be performed in order to decrease a load of the cloud 100.

In some further embodiments, to benefit from the service of the cloud 100 without accessing the cloud 100 by using the binary executable and content, is to be performed when benefiting from the service of the cloud 100 comprises more latency via accessing the cloud 110 than by not accessing the cloud 110.

The electronic device 120 may further be configured to, e.g. by means of a saving module 640 configured to, save the binary executable and content in a memory of the electronic device 120. In these embodiments, the electronic device 120 may further be configured to e.g. by means of the serving module 630 configured to, benefit from the service of the cloud 100 without accessing the cloud 100 by using the pushed binary executable and content directly in the memory.

The embodiments of pushing binary executable and content and benefiting from the service described above may be used separate or combined with each other.

The pushing module 620, the serving module 630, and the saving module 640 may be comprised in a processor 650 of the first network node 111.

The embodiments herein may be implemented through one or more processors, such as a processor 550 in the first network node 111 depicted in FIG. 5, and the processor 650 in the electronic device 120 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the in the first network node 111 or the electronic device 120. One such carrier may be in the form of a CD ROM disc. It is however feasible with other data carriers such as a memory stick. The computer program code may furthermore be provided as pure program code on a server and downloaded to the first network node 111 and/or the electronic device 120.

The network node 111 may further comprise a memory 560 comprising one or more memory units and the UE 120 may further comprise the memory 660 comprising one or more memory units. The memories 560, 660 are arranged to be used to store obtained information, binary executable and content, data, configurations, and applications etc. to perform the methods herein when being executed in the first network node 111 and/or the electronic device 120.

Those skilled in the art will also appreciate that the an obtaining module 510, the determining module 520, the retrieving module 530, the pushing module 540, the sending module 610, the pushing module 620, the serving module 630, and the saving module 640 described above may be comprised in and/or relate to a combination of analog and digital circuits, and/or one or more processors such as the processors 550 and 650 configured with software and/or firmware, e.g. stored in the memories 560, 660, that when executed by the one or more processors such as the processors in the first network node 111 and the electronic device 120 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a first network node for assisting an electronic device to benefit from functionality of a service provided by a cloud, wherein the first network node is comprised in the cloud, the method comprising:
    obtaining information from the electronic device, which information comprises computation and storage capability of the electronic device, and which information further comprises a usage pattern by the electronic device,
    determining, when the information satisfies predetermined criteria, a push content based on the information,
    retrieving from one or more second network nodes comprised in the cloud, binary executable and content, which binary executable and content are based on the push content, and
    pushing the binary executable and content to the electronic device to enable the electronic device to benefit from the functionality of the service of the cloud during a period when the electronic device is not connected to the cloud,
    wherein the binary executable and content relate to the functionality of the service, and
    wherein the usage pattern comprises a number of times the electronic device has accessed the functionality of the service;
    wherein the information satisfies the predetermined criteria when the computation and storage capability of the electronic device are at least of a predetermined level, and when the when the number of times the electronic device has accessed the functionality of the service is at least ten.

2. The method according to claim 1, wherein the binary executable is either an advanced version or a simplified version of the functionality.

3. A method in an electronic device for benefiting from functionality of a service provided by a cloud, the method comprising:
    sending information to a first network node, which information comprises computation and storage capability of the electronic device, and which information further comprises a usage pattern by the electronic device, and which first network node is comprised in the cloud, receiving, when the information satisfies predetermined criteria, a push of binary executable and content from the first network node, which pushed binary executable and content is based on the information sent to the first network node, and benefiting from the functionality of the service of the cloud during a period when the electronic device is not connected to the cloud, by using the pushed binary executable and content, wherein the binary executable and content relate to the functionality of the service, and wherein the usage pattern comprises a number of times the electronic device has accessed the functionality of the service;

wherein the information satisfies the predetermined criteria when the computation and storage capability of the electronic device are at least of a predetermined level, and when the when the number of times the electronic device has accessed the functionality of the service is at least ten.

4. The method according to claim 3, wherein the binary executable is either an advanced version or a simplified version of the functionality.

5. The method according to claim 3, further comprising:
saving the binary executable and content in a memory of the electronic device, and
wherein the benefiting from the functionality of the service of the cloud during the period when the electronic device is not connected to the cloud is performed by using the pushed binary executable and content directly in the memory.

6. A first network node for assisting an electronic device to benefit from functionality of a service provided by a cloud, wherein the first network node is adapted to be comprised in the cloud, the first network node being configured to:

obtain information from the electronic device, which information comprises computation and storage capability of the electronic device, and which information further comprises a usage pattern by the electronic device, determine, when the information satisfies predetermined criteria, a push content based on the information, retrieve from one or more second network nodes comprised in the cloud, binary executable and content, which binary executable and content are to be based on the push content, and push the binary executable and content to the electronic device to enable the electronic device to benefit from the functionality of the service of the cloud during a period when the electronic device is not connected to the cloud, wherein the binary executable and content relate to the functionality of the service, and wherein the usage pattern comprises a number of times the electronic device has accessed the functionality of the service;

wherein the information satisfies the predetermined criteria when the computation and storage capability of the electronic device are at least of a predetermined level, and when the when the number of times the electronic device has accessed the functionality of the service is at least ten.

7. The first network node according to claim 6, wherein the binary executable is either an advanced version or a simplified version of the functionality.

8. An electronic device for benefiting from a functionality of a service provided by a cloud, the electronic device being configured to:

send information to a first network node, which information comprises computation and storage capability of the electronic device, and which information further comprises a usage pattern by electronic device, and which first network node is adapted to be comprised in the cloud, receive, when the information satisfies predetermined criteria, a push of binary executable and content from the first network node, which pushed binary executable and content is to be based on the information sent to the first network node, and benefit from the functionality of the service of the cloud during a period when the electronic device is not connected to the cloud, by using the pushed binary executable and content, wherein the binary executable and content relate to the functionality of the service, and wherein the usage pattern comprises a number of times the electronic device has accessed the functionality of the service;

wherein the information satisfies the predetermined criteria when the computation and storage capability of the electronic device are at least of a predetermined level, and when the when the number of times the electronic device has accessed the functionality of the service is at least ten.

9. The electronic device according to claim 8, wherein the binary executable is either an advanced version or a simplified version of the functionality.

10. The electronic device according to claim 8, further being configured to:
save the binary executable and content in a memory of the electronic device, and
wherein to benefit from the functionality of the service of the cloud during the period when the electronic device is not connected to the cloud is to be performed by using the pushed binary executable and content directly in the memory.

* * * * *